April 1, 1969 — J. F. KENNELL ET AL — 3,435,812

ENGINE GOVERNOR FOR CONTROL AT MINIMUM AND MAXIMUM SPEED LEVELS

Filed May 16, 1967

INVENTOR.
JOSEPH F. KENNELL
BRACE C. SMITH

BY
Fryer, Tjensvold, Feix, Phillips & Lempio
ATTORNEYS 3,435,812
ENGINE GOVERNOR FOR CONTROL AT MINIMUM AND MAXIMUM SPEED LEVELS
Joseph F. Kennell, and Brace C. Smith, Peoria, Ill., assignors to Caterpillar Tractor Co., Peoria, Ill., a corporation of California
Filed May 16, 1967, Ser. No. 638,855
Int. Cl. F02d 1/04; G01p 15/02
U.S. Cl. 123—140   1 Claim

ABSTRACT OF THE DISCLOSURE

A minimum-maximum governor for compression ignition type engines which are used with manual or pedal fuel control and the operator is relieved of controlling against the force of a governor spring during the major part of the operating range of the engine, with particular reference to an improved governor flyweight design which enables a long range of control independent of governor forces and through simple mechanisms.

---

With increasing use of diesel engines in trucks and other vehicles dsigned for highway use requiring flexibility and speed, the burden of controlling governor settings with a foot pedal has been recognized. Various devices to relieve the operator of the burden of acting against the force of the governor spring have been devised. The purpose of such devices is to provide a governor which functions while the engine is operating in its low idle range and also function when the engine attains its maximum rated speed but does not function at intermediate speeds. This results, in the wide speed range in which the vehicle is normally operated, in a vehicle control actuated only by the operator's foot. This relieves the operator of the necessity of overcoming governor spring forces and also provides him with a feel that is comparable to that experienced in the actuation of the throttle of a conventional gas engine.

It is the object of the present invention to provide an improved minimum-maximum governor for the function above described and particularly to provide a very simple means for creating a long range between low and high speed operations in which the governing mechanism has no effect upon the operation of direct pedal actuated control of engine speed. Further objects and advantages of the invention are made apparent in the following specification which describes the engines by reference to the accompanying drawing.

Figure 1:
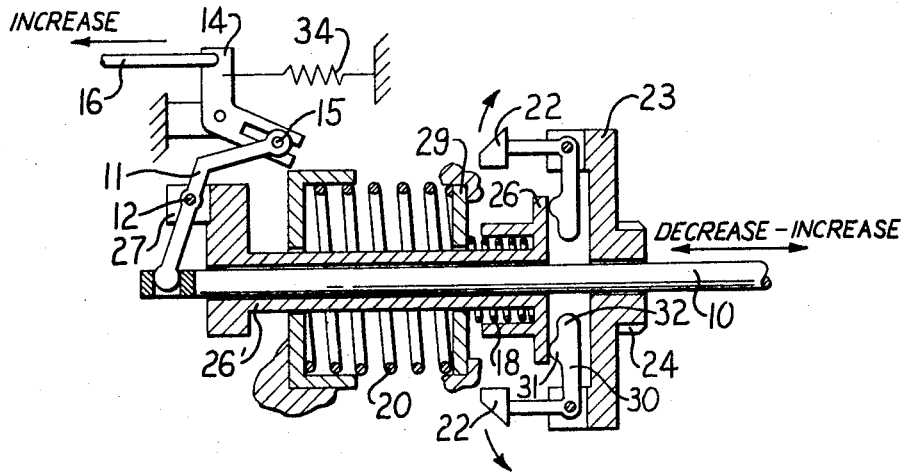
FIG. 1 is a schematic view of a governor embodying the present invention.

The governor shown comprises a fuel control member 10 which may be, for example, the conventional rack bar which adjusts the position of fuel pumps for varying the quantity of the fuel delivered to the combustion spacing of an engine upon each stroke of the pump in a well known conventional manner. Movement of this rack bar 10 to the right to increase fuel flow or to the left to decrease fuel flow may be accomplished by a lever 11 centrally pivoted as at 12 and engaging the rack bar at one end and pivotally engaged at its other end to a lever 14 through the medium of a pin and slot connection 15. A link 16 connects this lever with a pedal (not shown) so that fuel delivered to the engine is under control of an operator's foot.

Figure 2:
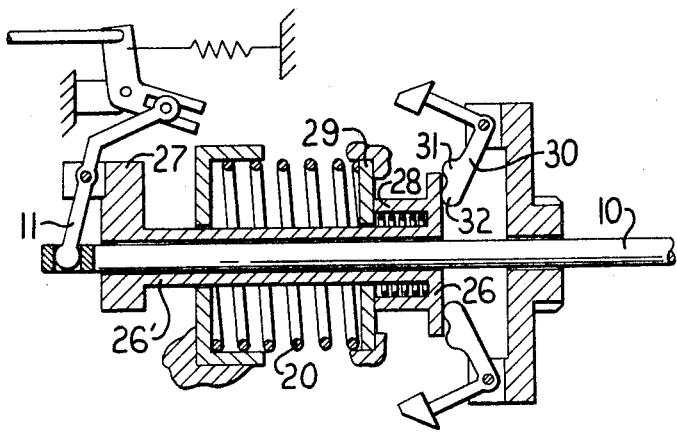
FIG. 2 is a similar view of the same governor with the parts assuming a different position.

A governor is associated with this control mechanism and comprises a small spring 18 having a relatively low rate for use in governing the engine only in its low idle range. A second spring 20 of higher rate is used in governing the engine only in the range of its maximum rated speed. A pair of flyweights 22 are pivotally supported on a flyweight carrier 23 which is driven in proportion to engine speeds by means of a suitable gear train (not shown) meshing with a toothed part 24 on the carrier. When the flyweights swing outwardly in response to engine speed in its low range, their inner ends bear against a thrust plate 26, against which the spring 18 is seated, and compress the spring to the position illustrated in FIG. 2 wherein a cylindrical spring enclosure 28 abuts a plate 29 which acts as a seat for the high rate spring 20. The thrust plate 26 is connected by a tubular extension 26', which is slidable with respect to the rack bar, with a bracket 27. The lever 11 is pivoted to this bracket so movement of the bracket is accompanied by movement of the rack.

The flyweights have inner lever arms 30 provided with spaced contact points or toes 31 and 32. The toes 31, which engage the pressure plate 26 during compression of the low rate spring 18, are closer to the pivot point of the fllyweight and therefore exert relatively greater force than do the toes 32 adjacent the ends of the lever arms. Consequently when the flyweights swing to the position shown in FIG. 2, toes 32 engaging plate 26 tend to compress the large spring 20, the flyweights are confined against further outward swinging movement, due to the reduced advantage of the leverage attained by the toes 32 and to the stiffness or greater rate of the spring 20, until a very much greater engine speed is attained. The governor design will be such that this high speed will be the maximum rated speed of the engine and consequently a range exists between low idle and maximum speed wherein there is no effective governing. During this range, the position of the rack bar 10 is entirely under control of the operator's foot wtih the exception of the force exerted by a small spring 34 acting on the lever 14 to return the fuel control toward a decreased position as the pressure of the operator's foot on the pedal is reduced.

When maximum rated speed is attained, the flyweights again swing outwardly compressing the spring 20 through the medium of the cylindrical housing 28 and the spring seat 29. This again moves the slidable tube 26' which carries the pivot support 27 and adjusts the rack bar through the medium of the lever 11.

Through the use of the variable leverage afforded by the spaced contact points on the flyweights, it is possible to overcome disadvantages of other minimum-maximum type governors wherein the high rate springs must be excessively heavy or a complex system of multiple governor weights is used.

We claim:
1. A minimum-maximum governor comprising a low rate coil type spring, a high rate coil type spring coaxially aligned therewith, a spring seat at one end of the high rate spring, a common spring seat between the springs, a combination thrust plate and spring seat at the opposite end of the low rate spring, a single set of flyweights acting to compress first the low rate and then the high rate spring in response to increasing engine speed, said flyweights having lever arms with spaced points engageable successively to compress the low rate spring with a given leverage and later compress the high rate spring with a lesser leverage, each flyweight comprising a lever pivoted intermediate its ends, a weight at one end and two successively engageable spring compressing points at the other end, one of said points being so spaced from the pivot that the flyweights will not compress the high rate spring until the engine speed approaches its maximum rated range.

References Cited

UNITED STATES PATENTS

| | | | |
|---|---|---|---|
| 112,420 | 3/1871 | Conde | 73—550 |
| 2,317,022 | 4/1943 | Benjamin | 123—140 |
| 2,669,983 | 2/1954 | Reddy et al. | 123—140 |
| 2,717,587 | 9/1955 | Links et al. | 123—140 |

LAURENCE M. GOODRIDGE, *Primary Examiner.*

U.S. Cl. X.R.

73—550